May 30, 1933.  A. J. LEWIS  1,911,632
MULTIPLE CHUCKING MACHINE
Filed Nov. 14, 1930   2 Sheets-Sheet 1
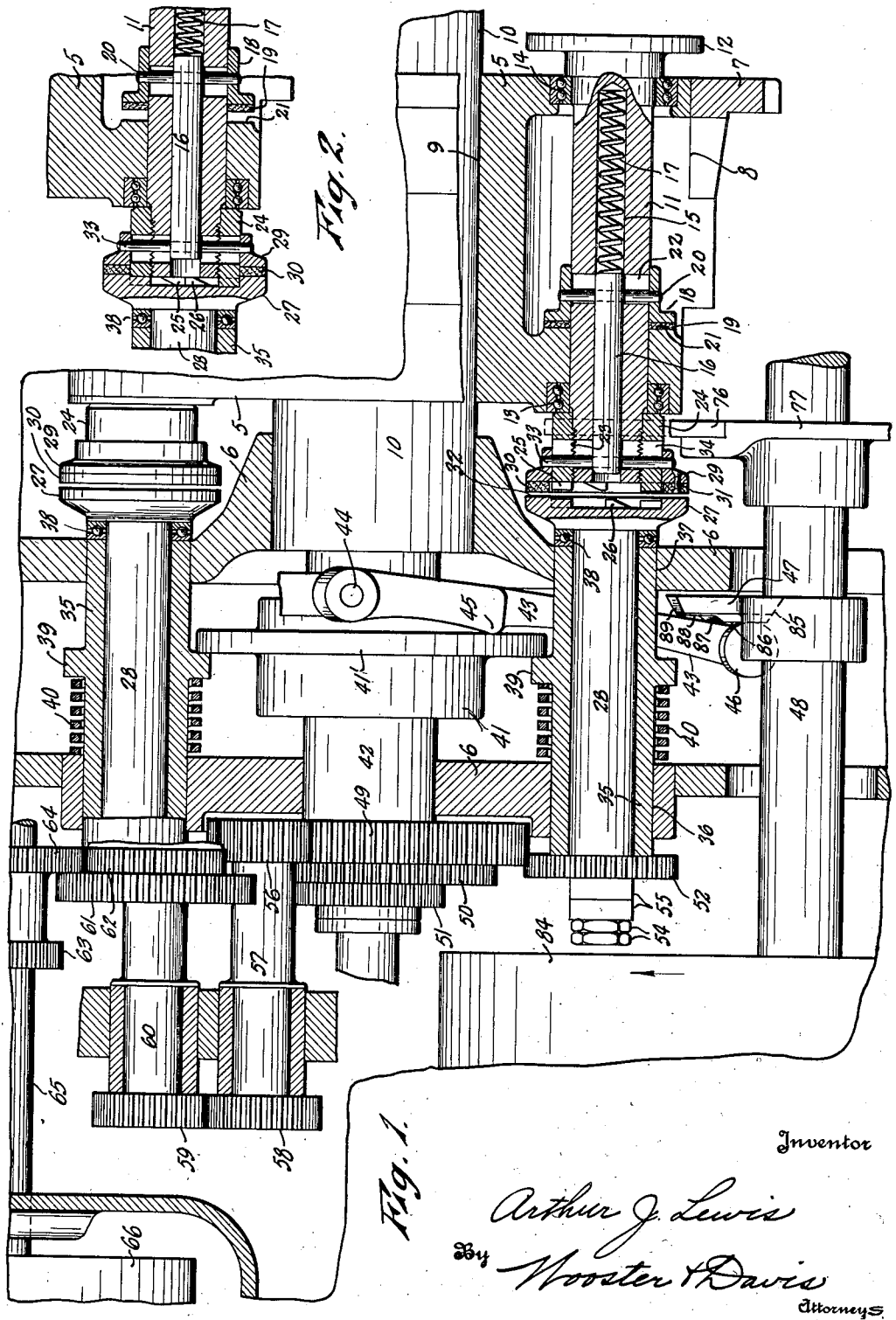
Inventor
Arthur J. Lewis
By Wooster & Davis
Attorneys May 30, 1933.  A. J. LEWIS  1,911,632
MULTIPLE CHUCKING MACHINE
Filed Nov. 14, 1930  2 Sheets-Sheet 2
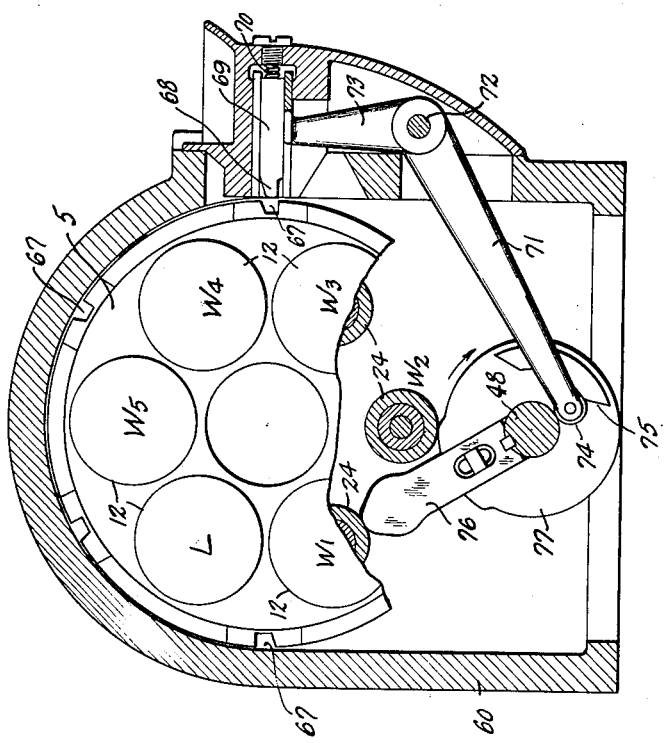
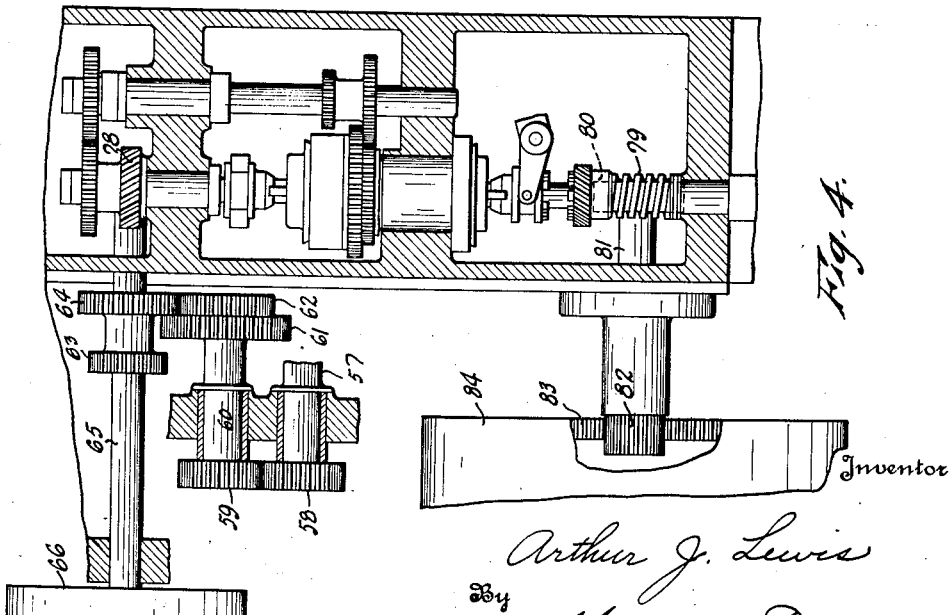
Inventor
Arthur J. Lewis
By Wooster & Davis
Attorneys Patented May 30, 1933

1,911,632

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

MULTIPLE CHUCKING MACHINE

Application filed November 14, 1930. Serial No. 495,633.

This invention relates to a multiple spindle chucking machine of the type wherein there are a plurality of spindles for carrying the work to be operated upon to provide a plurality of working stations at which different machining operations may be performed, together with means for indexing the spindles to carry the work to the different stations for these different operations. It has for an object to provide an improved driving means for the work spindles which will speed up the operation of the machine and thus increase production, and will decrease the strain on the operating parts; and more particularly it has for an object to provide an improved releasable driving means for the individual work spindles at the different working stations, which driving means comprises a frictional drive and a positive drive with means for so operating the driving means that in starting the work spindles rotating the friction drive first becomes effective to bring the spindles up to speed and then the positive drive becomes effective to operate the spindles for the machining operations.

It is another object to provide means associated with this improved drive and controlled thereby for braking the work spindles when the drive is released and to automatically release the brake as soon as the friction drive starts to take effect. A further object is to provide an improved driving means for the individual spindles which will start these spindles operating after the indexing operation without any shock or jar, and which will do away with the necessity of having a friction clutch drive in the main driving mechanism which must be released during each indexing operation, so that instead of it being necessary to overcome the inertia of and bring up to speed the entire driving mechanism after each indexing operation as in the old construction, in my improved construction this main driving mechanism can remain running at full speed during the indexing and it is only necessary after the indexing is completed to overcome the inertia of the work spindles.

With the foregoing and other objects in view the invention consists in certain novel features of construction, combinations and arrangements of parts as will be more fully disclosed in connection with the accompanying drawings, it being understood that various modifications may be employed without departing from the principles of the invention.

In these drawings:

Fig. 1 is a partial longitudinal section through the turret carrying the work spindles certain of the parts being shown in side elevation, one of the spindles and its driving mechanism being shown in section, the parts being in the positions occupied when released and the working spindle is not being driven.

Fig. 2 is a detail section through a portion of a spindle and its releasable driving means showing the elements in driving position.

Fig. 3 is a transverse section showing the indexing mechanism for the turret, and Fig. 4 is a partial section and partial side elevation of the drive means for the indexing mechanism.

This machine is of the general type disclosed in my prior application for chucking machine, Serial No. 362,974, filed May 14, 1929, but has an improved driving mechanism for the work spindles. In the present construction there is a rotatable turret 5 mounted in suitable supporting and bearing means in the frame 6, there being a bearing ring 7 in which the turret may have an external bearing 8, the ring 7 being secured by any suitable means, not shown, to the frame. The turret may also have an internal bearing 9 on a central longitudinal supporting bar 10 which may carry the tool operating means, not shown, and also may carry the supports for the tool slides if desired, this construction being the same as that disclosed in my prior application mentioned.

Carried in the turret so as to rotate therein are a plurality of work spindles 11. Any suitable number may be provided but six has been found very satisfactory and that number is shown in the present instance. Each spindle may carry a head 12 on which is mounted a suitable chuck or other means, not shown, for gripping the work to be machined. Each spindle is mounted to rotate in suitable bearings in the turret, in the present arrangement there being two ball bearings 13 and 14. Each spindle is constructed the same and is driven by the same type of mechanism shown more clearly in Figs. 1 and 2. As shown, the inner end of the spindle 11 projects from the inner end of the turret and has a longitudinal central passage 15 in which is slidably mounted a bar 16. A spring 17 in the passage engages the end of this bar and tends to shift it to the left as shown in Figs. 1 and 2. Mounted on the exterior of the spindle and adapted to slide longitudinally thereon is a brake collar 18 which may carry a friction facing 19 of any suitable and well known brake material, such as compressed asbestos fibre held together by a suitable binder. A transverse pin 20 connects this collar with the rod 16 so that the collar rotates with the spindle, and the facing 19 may engage a stationary surface 21 on the turret to secure a braking effect when the facing 19 is pressed against this surface under the action of the spring 17. Pin 20 passes through an elongated transverse slot 22 in the spindle which permits longitudinal movement of the pin in the spindle to shift the collar 18 but compels the pin and collar to rotate with the spindle.

The projecting inner end of the spindle is threaded as indicated at 23 to receive a similarly threaded collar 24, this collar serving to retain the spindle in its bearing in the turret and also providing means for coacting with the indexing mechanism later to be described. This collar also has at its free end clutch teeth or lugs 25 adapted to engage similar teeth or lugs 26 on the head 27 of a driving shaft or spindle 28. Mounted to slide longitudinally on the collar 24 is a sleeve 29 which carries a friction facing 30 similar to the facing 19 and secured thereto by any suitable means such for example as the rivets 31. This facing is adapted to engage the face 32 of a head 27 on the driving shaft or spindle 28 to provide a friction drive between the driving spindle and the work spindle. A transverse pin 33 connects the sleeve 29 with the rod 16, which pin passes through elongated slots 34 in the collar 24 and the spindle 11 which permits this pin 33 to slide longitudinally in the spindle and form a driving connection between the sleeve 29 and the spindle 11. It will thus be seen that both the collar 18 and the sleeve 29 are connected to the rod 16 to move therewith longitudinally of the spindle, but that both collar 18 and sleeve 29 must rotate with the spindle 11.

The driving shaft or spindle 28 is mounted to rotate in a suitable longitudinally slidable sleeve 35. The sleeve 35 is mounted to slide longitudinally in suitable bearings 36 and 37 in the frame 6 and there may be a ball thrust bearing 38 to carry the thrust from the driving connection with the work spindle.

The sleeve 35 has an external shoulder which may be on a flange 39 which is engaged by a flange 41' on a collar 41 slidable on a central supporting bar 42. A lever 43 is pivotally mounted at 44 and has a fork 45 engaging the flange 41' whereby the collar 41 may be shifted to the left to shift the sleeves 35 and the driving head 27 away from engagement with the work spindles. The lever 43 may be operated by any suitable means such as a roller 46 mounted on the lever and adapted to be operated by a cam 47 on a cam shaft 48, as will be more specifically described later. A spring 40 embraces the sleeve 35 and engages at its opposite ends the frame 6 and flange 39 and this spring tends to shift the sleeve 35 and driving shaft 28 to the right as viewed in Figs. 1 and 2 to shift the driving head 27 toward the work spindle and hold it in driving engagement therewith. The spring 40 should be heavier than spring 17 so that when spring 40 is released it will overcome the action of spring 17 and force the sleeve 29, rod 16 and collar 18 to the right.

The shafts 28 may be driven by any suitable means but preferably from a set of central gears 49, 50 and 51, meshing with a gear 52 on each shaft. It will be noted that the gears 49, 50 and 51 are of different diameters and by using different size gears 52 on the different shafts 28 to mesh with the different gears 49, 50 and 51, the different shafts 28 may be driven at different speeds. Thus, as gears 49, 50 and 51 rotate at the same speeds a gear 52 meshing with the larger gear 49 would drive the shaft 28 at the highest speed. If the gear 52 is of a larger diameter to mesh with the intermediate gear 50 the shaft 28 carrying this gear will be driven at an intermediate speed lower than the first speed, while if the gear 52 on the shaft 28 is of a larger size to mesh with the smallest gear 51 the shaft 28 carrying this larger gear will be driven at a still lower speed. The gears 52 are detachably mounted on the shafts 28 by means of the removable nuts 54 and the spacing collars 55. Thus, with this arrangement each driving shaft 28 at the different work stations may be driven at different speeds as desired depending on the size of the gear 52 applied thereto and depending on with which gear 49, 50, 51 it meshes. Gears 49, 50 and 51 are driven from any suitable source of power through any suitable driving mechanism such as the train of gearing shown, including a gear 56 meshing with the gear 49 carried on a shaft 57 on which is a gear 58 meshing with a gear 59 on a shaft 60.

On the shaft 60 are two gears 61 and 62 of different diameters which may mesh respectively with gears 63 and 64 of different diameters on the drive shaft 65 to secure different speeds. This may be done by shifting gears 61 and 62 on their shaft to bring gear 61 into mesh with gear 63 and moving gear 62 out of mesh with gear 64. Shaft 65 is driven from any suitable source of power, not shown, such as an electric motor or by means of a belt running over a pulley 66 on the shaft 65.

In Fig. 3 is shown mechanism for indexing the turret 5. This turret during the machining operations must be securely locked against movement to prevent its shifting and to insure accurate work. Thus, it may be provided with a series of notches 67 adapted to receive the end 68 of a locking bar 69 movable toward and from engagement with these notches. A spring 70 tends to shift this bar to seat its end 68 in one of the notches 67 and lock the turret in position. It is automatically retracted to the position of Fig. 3 just before the indexing operation through the lever 71 pivoted at 72 and having an arm 73 connected to the bar 69. The arm 71 carries a roller 74 adapted to engage a cam 75 on the cam shaft 48 at the proper time to retract the bar 69 and release the turret just before the indexing operation. The cam 75 holds the bar 69 in the released position until the indexing is completed and then permits the bar 69 to move into the proper notch 67 to lock the turret against movement during the machining operation and until time for the next indexing operation.

The actual indexing of the turret and the work spindles carried thereby may be accomplished by any suitable means such as an arm 76 carried on a suitable support 77 on the cam shaft 48 and in position to engage the collars 24 on the work spindles, to rotate the turret with a step by step movement to shift the work spindles the distance between two or more driving shafts 28 as desired. In the present instance the shaft 48 is geared to make one complete revolution for each cycle of operations comprising an indexing movement and a machining operation, the indexing involving the shifting of the work spindle one station at each indexing operation, but of course the elements can be geared and arranged to give a double or plural indexing, that is, to move the work spindles the distance between two or more stations as disclosed in my prior application for chucking machine, Serial No. 484,357, filed September 25, 1930.

The cam shaft 48 may be driven from the main drive shaft 65 through any suitable mechanism, such for example as that shown in Fig. 4. In this arrangement there is a worm on the shaft 65 meshing with a worm gear 78 which through a suitable gear train, which may also include suitable clutches. may drive a worm 79 meshing with a gear 80 on shaft 81 driving the pinion 82 meshing with an internal gear 83 on the cam drum 84 mounted on the cam shaft 48. This drum 84 may carry suitable cams, not shown, for operating the tools and other devices as disclosed in my prior applications above mentioned. This drive mechanism for the cam shaft is substantially the same as that shown in my application Serial No. 362,974 mentioned.

The operation of the device is as follows:

We may assume that any one of the six stations provided by the six work spindles may be called a loading station and the remaining spindles the work stations. Thus, for example, as shown in Fig. 3, L may be considered the spindle at the loading station and $W_1$ to $W_5$ may be considered the spindles at the working stations. Ordinarily, the spindle at the loading station L is stationary during the working operations, that is, this spindle is stationary to permit removal of the finished piece of work and mounting of an unfinished piece of work while the machining operations are being performed at the various work stations. Thus, there will be no drive shaft 28 provided for the spindle at the loading station L, but there will be a drive shaft 28 in alignment with each of the spindles at each of the working stations $W_1$ to $W_5$.

All of these driving connections from the driving shafts to the work spindles at the work stations will be released and engaged simultaneously by shifting of collar 41 through the lever 43 and cam 47. Thus, if we assume that an unfinished piece of work has been placed on the spindle at the loading station L and the machining operations have been completed at the various work stations, the rotation of the cam shaft 48 will cause the cam surface 85 to engage roller 46 to shift the lever 43 to the left and with it collar 41. This will shift to the left all of the sleeves 35 and their drive shafts 28 against the action of the springs 40. This will shift the driving head 27 away from each work spindle and release the clutch 26 from the clutch 25 so that there is no longer driving connection between the shaft 28 and the work spindle. This movement will also permit the spring 17 in each work spindle to shift the bar 16 and sleeve 18 to the left and permit the friction facing 19 to engage the stationary surface 21 and quickly stop rotation of the spindle.

At about the same time the cam 75 unlocks the turret and further rotation of the cam shaft 48 carrying with it the arm 76 turns the turret a partial revolution to carry the work spindles to the next stations. The cam 75 then permits the bar 69 to lock the turret in this new position. During this time the roller 46 has been on the cam surface 86 and has held the driving connections between the drive shafts 28 and the work spindles released. Further rotation of the cam shaft 48 now permits roller 46 to run down the incline 87 to the intermediate surface 88. This permits the sleeves 35 and the shafts 28 to be shifted to the right under the action of the springs 40 a sufficient distance to cause the surface 32 on the driving heads 27 to engage the friction surfaces 30 carried by the work spindles. The cam permits the head 27 to move sufficiently to have good frictional engagement with the member 30 but insufficient to cause the positive drive clutch 26 to engage the clutch 25. The movement is, however, sufficient to hold the brake 19 away from the surface 21 and thus release the brake. The roller 46 now runs on the surface 88 which is a dwell to maintain the elements in this position for a sufficient time to permit the friction drive 27, 30 to bring the work spindle 11 up to the speed of the shaft 28, it being understood that the shafts 28 and their drive mechanism are all rotating at their usual and constant speed during the indexing operation. Now, when the friction drives have brought the work spindles 11 up to substantially the speeds of the driving shafts 28 the roller 46 runs off the incline 89 of the cam 47 and permits the driving shafts 28 and driving heads 27 to be shifted still further to the right under the action of springs 40 to cause the positive drive 26 to engage the clutch 25 for the machining operations. Thus, it will be evident that with this mechanism the work spindles 11 are first brought up to speed by the friction drive alone without any sudden jar or heavy strain on the driving mechanism, and that when they have been brought up to the speed of the drive shafts the positive drive mechanism is permitted to engage without any sudden jar on the mechanism.

It is to be noted that the brake 19 is automatically controlled with the operation of the releasable driving connection between the drive shaft 28 and the work spindle so that when the drive is released between the drive shaft and the spindle the brake is automatically permitted to engage to quickly stop the work spindle so that it is not necessary to wait for the momentum of the spindle and the work to be gradually dissipated and on the opposite movement of the driving movement of the driving means between the drive shafts 28 and the work spindles the brake is immediately released as soon as the friction drive becomes effective.

It is also to be noted that with this drive mechanism the driving shafts 28 and their driving gears all remain rotating during the indexing operation. Therefore, it is not necessary to provide the usual friction clutch in the main drive 65 and after the indexing operation it is not necessary to overcome the inertia of these driving gears and shafts but it is only necessary to overcome the inertia of the work spindles 11. This reduces the time required for the indexing operation as the spindles can be brought to speed in a shorter time and with less strain on the mechanism, and thus production can be increased and the machine is less liable to break down.

Having thus set forth the nature of my invention what I claim is:

1. In a machine of the character described, a frame, a turret, means for indexing the turret, a plurality of work spindles carried by the turret, an individual releasable driving means for the respective spindles mounted on the frame in alignment with the spindles so that they are not indexed with the turret and the spindles are moved successively into alignment with different driving means, means by which the different driving means may be driven at different speeds, said individual driving means each comprising a friction drive and a positive drive, and means for operating said driving means to shift it axially toward the spindle to first cause the friction drive to engage and bring the spindle up to speed and then cause the positive drive to engage.

2. In a machine of the character described, a plurality of work spindles, a support therefor, an individual releasable driving means for the respective spindles mounted to move entirely away from the spindles so that the spindles may move laterally therefrom, means by which the different driving means may be driven at different speeds, said individual driving means each comprising a friction drive and a positive drive, means for shifting the work spindles laterally independently of the driving means to bring them to driving relation with different driving means, and means for operating the driving means to first cause the friction drive to engage and bring the spindle up to speed and then cause the positive drive to engage.

3. In a machine of the character described, a frame, a rotatable turret, a plurality of work spindles carried by the turret, a plurality of releasable driving means associated with the various work spindles located on the frame in alignment with the spindles and movable outwardly away from the work spindles to permit indexing of the turret and each comprising a friction drive and a positive drive, means for operating the driving means to first cause the friction drives to engage and bring the spindles up to speed and then cause the positive drives to engage, means for indexing the turret to shift the spindles laterally of the driving means to bring the different spindles into association with the different driving means, and means for operating the driving means and the indexing means in certain timed relation.

4. In a machine of the character described, a frame, a rotatable turret, a plurality of work spindles carried by said turret, a plurality of releasable driving means one for each of a plurality of said spindles located on the frame in alignment with the spindles and movable away from the spindles so as to be entirely disconnected therefrom, said driving means each comprising a friction drive and a positive drive, means by which the different driving means may be driven at different speeds and at constant speeds, means for operating the driving means to first cause the friction drives to engage and bring the spindles up to speed and then cause the positive drives to engage, means for indexing the turret to shift the work spindles laterally independently of the driving means to bring the different spindles into association with the different driving means, and means for operating the driving means and the indexing means in certain timed relation.

5. In a machine of the character described, a work spindle, a support therefor, a brake associated with said spindle including an axially shiftable braking element rotatable with the axle, a releasable driving means for said spindle comprising a friction drive and a positive drive, an operative connection from the friction drive to the shiftable brake element to shift it axially to release the brake when said drive is engaged and to cause the brake to shift axially in the opposite direction to function when said drive is released, and means for operating the driving means to first cause the friction drive to engage to bring the spindle up to speed and then cause the positive drive to engage.

6. In a machine of the character described, a frame, a rotatable turret mounted therein, a plurality of work spindles in the turret providing a plurality of stations, a drive shaft at the various stations located outside the turret, a releasable jaw clutch drive between each shaft and the adjacent spindle and that on the shaft shiftable entirely clear of the spindle to permit lateral shifting of the spindle independently of the shaft, means for releasing and engaging the clutch, means for indexing the turret to move the spindles laterally to different stations, means operated in timed relation with the clutch operating means to first bring the spindles to substantially the speeds of the shafts when the clutches are disengaged and then cause the clutches to engage, and means for operating the indexing means in timed relation with the clutch operating means.

7. In a machine of the character described, a frame, a rotatable turret mounted therein, a plurality of work spindles in the turret providing a plurality of stations, a drive shaft at the various stations located outside the turret, releasable interlocking means on the shafts and the adjacent spindles to provide positive drives from the shafts to the spindles, the means on the shaft being movable axially out of the path of movement of the spindle to permit lateral shifting of the spindle independently of the shaft, means for releasing and engaging these driving means, means operated in timed relation with the driving means to bring the spindles to substantially the speeds of the shafts with the driving means disengaged and then cause these driving means to engage, means for indexing the turret to move the spindles to different stations, and means for operating the driving means and the indexing means in timed relation.

8. In a machine of the character described, a supporting frame, a work spindle therein, a drive shaft shiftable laterally with respect to the spindle, a releasable positive drive between the shaft and the spindle comprising interengaging means on the shaft and spindle, said means on the shaft being shiftable axially out of the path of movement of the spindle to permit said shifting of the spindle, means to release and engage said drive, means whereby the spindle may be brought to substantially the speed of the shaft with said drive released, and means for operating the latter means and the drive releasing and engaging means in certain timed relation.

9. In a machine of the character described, a supporting frame, a work spindle therein having a longitudinal passage, a bar slidable in said passage, a spring tending to shift the bar, a clutch member on the shaft having driving teeth, a driving shaft in alignment with the spindle, a clutch member on the spindle having teeth to engage those of the first clutch member, said shaft being slidable longitudinally to engage and disengage said clutch members, a movable brake member connected to said bar and adapted to stop the spindle, and means connected to said bar operated by engaging movement of the clutch members to release the brake.

10. In a machine of the character described, a supporting frame, a work spindle therein, a movable brake member adapted to stop rotation of the spindle, a drive shaft in alignment with the spindle and slidable longitudinally, cooperating friction drive members on the shaft and the spindle, the member on the spindle being slidable longitudinally thereof and adapted to yield when engaged by the clutch member on the shaft, a connection between the slidable clutch member and the brake to operate the brake, and means for shifting the shaft toward and from the spindle to engage and release the clutch.

11. In a machine of the character described, a supporting frame, a work spindle therein, a longitudinally movable drive shaft in alignment therewith, a clutch member on the shaft having a friction surface and clutch teeth, complementary teeth on the spindle adapted to cooperate with those on the shaft for a positive drive, a movable member mounted to slide longitudinally of the spindle and connected to rotate therewith, said movable member having a friction member to engage the friction surface on the shaft, yielding means tending to shift said movable member toward the shaft, and means for shifting the shaft toward the spindle, said movable member being mounted to engage the friction surface and bring the spindle up to approximately the speed of the shaft before the positive drive teeth engage.

12. In a machine of the character described, a supporting frame, a work spindle therein, a longitudinally movable drive shaft in alignment therewith, a releasable clutch drive between the shaft and the spindle comprising a member on the shaft having a friction surface and clutch teeth, complementary clutch teeth on the spindle to cooperate therewith, a friction member on the spindle secured to rotate therewith and adapted to engage the friction surface on the shaft and be driven thereby, said friction member being slidable longitudinally of the spindle, a spring tending to shift said member toward the shaft and retain it in position to engage the friction surface before the clutch teeth engage, and means for shifting the shaft toward and from the spindle to engage and disengage the clutch drive including a cam adapted to permit the friction members to engage and bring the spindle up to the speed of the shaft before the clutch teeth engage and then permit said teeth to engage for a positive drive.

13. A multiple chucking machine comprising the combination of a frame, a turret mounted therein, a plurality of work-carrying spindles mounted for rotation therein, means for indexing the turret, a plurality of driving shafts adapted for connection with the spindles for driving them in the periods of rest between the indexing movements and located outside the turret, means for moving the shafts toward and away from the spindles and in the latter movement shifting them outside the path of movement of the spindles to permit lateral movement of the spindles independently of the shaft, and means actuated by said movement toward the spindles for causing first frictional engagement and then positive engagement of the shaft with the spindles.

14. A multiple chucking machine comprising the combination of a frame, a turret mounted therein, a plurality of work-carrying spindles mounted for rotation therein, means for indexing the turret, a brake for each spindle, a plurality of driving shafts located outside the turret adapted for connection with the spindles for driving them in the periods of rest between the indexing movements, means for moving the shafts toward and away from the spindles and in the latter movement shifting them outside the path of movement of the spindles to permit lateral movement of the spindles independently of the shafts, and means actuated by said movement toward the spindles for causing frictional engagement of the shafts with the spindles and simultaneous release of said brakes and then causing positive engagement of the shaft and spindles.

In testimony whereof I affix my signature.

ARTHUR J. LEWIS.